H. A. JAVINS.
COMBINED CAN CONTAINER AND PERFORATOR.
APPLICATION FILED MAR. 5, 1910.
979,072.
Patented Dec. 20, 1910.
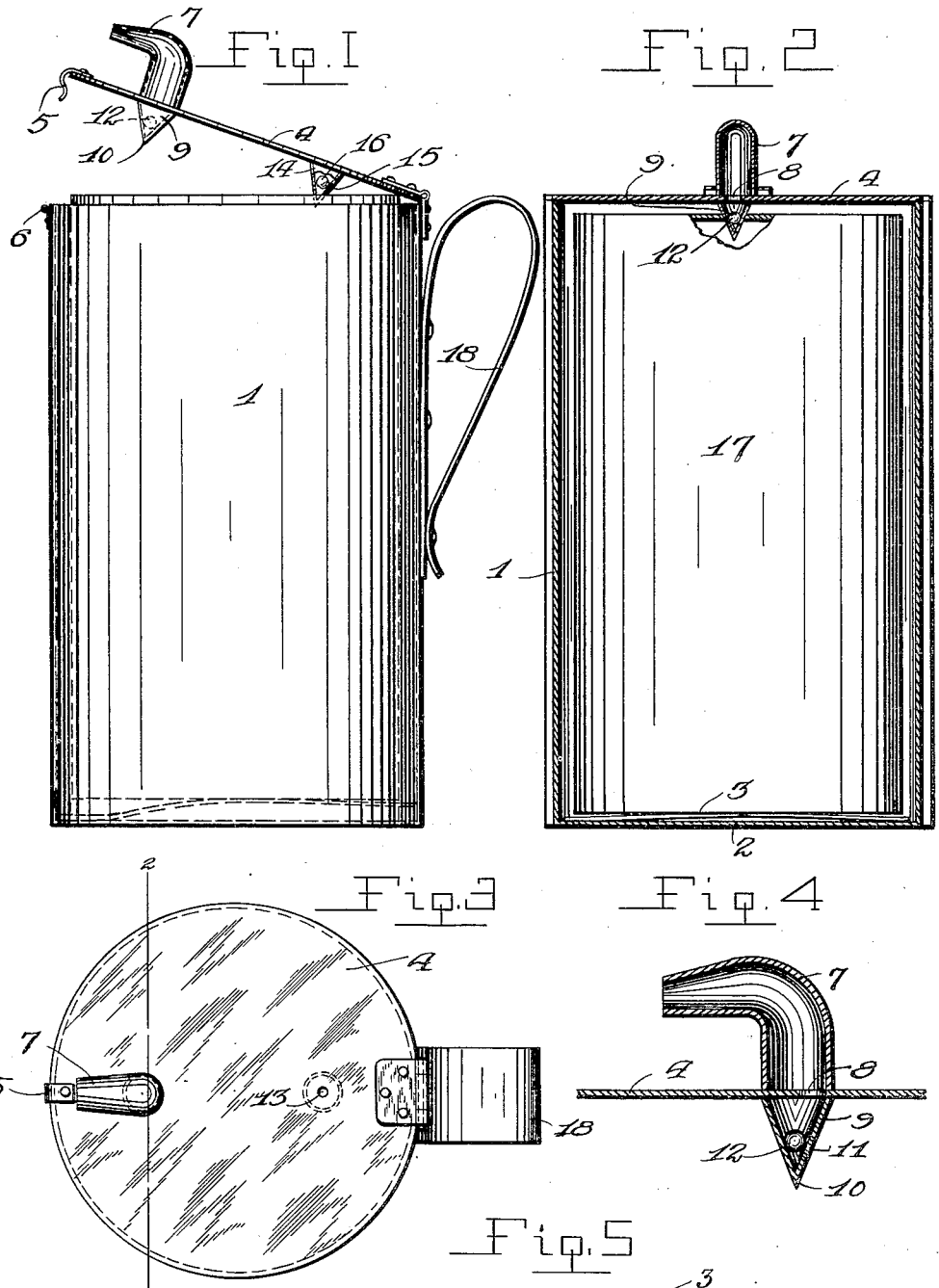

UNITED STATES PATENT OFFICE.

HARRY A. JAVINS, OF BURLINGAME, CALIFORNIA.

COMBINED CAN CONTAINER AND PERFORATOR.

979,072.  Specification of Letters Patent.  Patented Dec. 20, 1910.

Application filed March 5, 1910. Serial No. 547,594.

*To all whom it may concern:*

Be it known that I, HARRY A. JAVINS, a citizen of the United States, residing at Burlingame, in the county of San Mateo and State of California, have invented certain new and useful Improvements in Combined Can Containers and Perforators, of which the following is a specification.

This invention relates to receptacles for inclosing condensed milk or other cans the contents of which evaporate or deteriorate when exposed to air, and the principal object of the same is to provide the receptacle with means that will perforate the can to permit its contents to be poured and also to permit the necessary air to enter the can during the pouring operation, said perforating means being provided with automatically acting valves that will open during the pouring operation and close when the pouring operation ceases.

The invention also contemplates providing the receptacle with means that will automatically project a can above the upper edge of the receptacle when the cover thereof is raised so that the removal of the can is facilitated.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved receptacle, the cover thereof being raised and a can in the receptacle projecting above the upper edge thereof. Fig. 2 is a vertical sectional view of the receptacle taken on the line 2—2, Fig. 3 the cover thereof being closed. Fig. 3 is a top plan view. Fig. 4 is a fragmentary vertical section view of the cover of the receptacle, showing the pouring spout and one of the can-perforating valve casings. Fig. 5 is a top plan view of a spring carried by the bottom of the receptacle.

Referring to said drawings by numerals, 1 designates the body of the improved receptacle which is preferably cylindrical and provided with a bottom 2 upon the inner surface of which a spring 3 is mounted. Said spring is preferably a flat one and has its ends soldered or otherwise rigidly fastened to bottom 2, the intermediate portion of said spring being outwardly bowed.

A cover 4 is hinged to said body 1, said cover provided with a latching lip 5 at its free portion that is adapted to engage with a lug 6 carried by body 1 to retain said cover closed. Adjacent its free portion, cover 4 has a pouring spout 7 projecting from its upper surface which surrounds an opening 8 formed through said cover. A valve casing 9 depends from the lower surface of cover 4 and surrounds opening 8, said cover being in the form of an inverted cone and preferably formed of steel. The apex 10 of casing 9 provides a penetrating point, and adjacent said point, an inlet opening 11 is formed through said casing. A valve 12, preferably a ball, is loose in said casing and seals opening 11 when the cover 4 is closed. Cover 4 is provided with an air inlet opening 13 which is surrounded by a valve casing 14 that is similar to casing 10 and which is provided with an opening 15 adjacent its penetrating point. A valve 16 in casing 14 seals opening 15 when cover 4 is closed.

In use, a can 17 is placed in body 1 and cover 4 latched to said body. As cover 4 closes, valve casings 9 and 14 penetrate the top of the can. To discharge the contents of can 17, receptacle 1 is tilted and said contents will flow into valve casing 9 through opening 11 to spout 7. The tilting of the receptacle, obviously causes valve 12 to unseal opening 11 and valve 16 to unseal opening 15 of casing 14 so that the contents of the can have an unobstructed passage to spout 7, and air passes through opening 13 of cover 4 to and through valve casing 14 and enters the can. When the receptacle is returned to its normal position, valves 12 and 16 automatically return to positions to seal openings 11 and 15.

A handle 18 is provided for body 1 to facilitate handling the receptacle.

In addition to the prominent features of the invention set forth above, it will be understood that when a can is forced into the receptacle, the spring 3 is flattened, and when the cover is opened, the said spring will cause the upper portion of the can to project above body 1 so that it may be readily grasped, thereby facilitating the removal of the can.

What I claim as my invention is:—

1. A can container and perforator comprising a body, a cover hinged thereto, said cover provided with an air inlet and discharge opening, a spout projecting from the cover and surrounding one end of the discharge opening, a valve casing depending from said cover and surrounding the other end of said discharge opening, said casing provided with a penetrating point and also with an opening, a valve in said casing normally sealing said opening, a valve casing depending from said cover and surrounding said air opening, said valve casing provided with a penetrating end and with an air opening, and a valve in said last-mentioned casing normally sealing said air opening.

2. A can container and perforator comprising a body, a cover therefor provided with can perforating means also adapted to permit the discharge of the contents of a can when said cover is closed, and means carried by said body for projecting a can above the upper edge thereof when said cover is opened.

3. A can container and perforator comprising a body, a cover therefor, means carried by said cover for perforating a can within said body when said cover is closed, and a spring carried by the bottom of said body for projecting a can above the upper edge of said body when said cover is opened.

4. A device of the character described comprising a body, a cover therefor, an air supplying valve casing, a discharge valve casing carried by the under surface of said cover, said valve casings having pointed ends adapted to penetrate a can in said body, and a pouring spout communicating with said discharge casing.

5. A device of the character described comprising a body, a cover hinged thereto, a pair of inverted cone shaped can-penetrating valve casings depending therefrom, and a discharge spout carried by said cover and communicating with one of said casings.

6. A device of the character described comprising a body, a cover hinged thereto, means for locking said cover in a body-closing position, said cover provided with openings, a valve casing depending from each opening and provided with can-penetrating means, said casings provided with an opening, a valve in each casing for normally sealing the openings therein, and pouring means carried by said cover and communicating with one of the openings therein.

In testimony whereof I affix my signature in presence of two witnesses.

HARRY A. JAVINS.

Witnesses:
H. C. SCHROEDER,
F. P. SCHROEDER.